(12) United States Patent
Tiwari

(10) Patent No.: US 10,103,980 B1
(45) Date of Patent: Oct. 16, 2018

(54) METHODS AND APPARATUS FOR MAINTAINING AN INTEGRATED ROUTING AND BRIDGING INTERFACE

(75) Inventor: Manoj Tiwari, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 349 days.

(21) Appl. No.: 13/419,527

(22) Filed: Mar. 14, 2012

(51) Int. Cl.
  *H04L 12/721* (2013.01)
  *H04L 12/947* (2013.01)
  *H04L 12/933* (2013.01)

(52) U.S. Cl.
  CPC .......... *H04L 45/66* (2013.01); *H04L 49/1561* (2013.01); *H04L 49/25* (2013.01)

(58) Field of Classification Search
  CPC ...... H04L 49/25; H04L 45/66; H04L 49/1561
  USPC ........................................................ 370/392
  See application file for complete search history.

(56) References Cited

U.S. PATENT DOCUMENTS

| 7,856,024 | B1 | 12/2010 | Karuppiah et al. | |
|---|---|---|---|---|
| 2008/0037561 | A1* | 2/2008 | Wu | H04L 12/2881 370/400 |
| 2010/0189117 | A1* | 7/2010 | Gowda et al. | 370/401 |
| 2010/0220730 | A1* | 9/2010 | Finn et al. | 370/395.1 |
| 2011/0211585 | A1* | 9/2011 | Kodaka et al. | 370/401 |
| 2012/0287936 | A1* | 11/2012 | Biswas et al. | 370/395.3 |
| 2012/0320800 | A1* | 12/2012 | Kamble et al. | 370/255 |
| 2013/0262713 | A1* | 10/2013 | Maeda | G06F 13/385 710/30 |

OTHER PUBLICATIONS

IRB—Integrated Routing and Bridging, Retrieved from the Internet: <URL: http://web.archive.org/web/20110309165919/http://kpjungle.wordpress.com:80/2010/12/ >Jan. 26, 2012.
Understanding and Configuring VLAN Routing and Bridging on a Route Using the IRB Feature, Cisco Systems, Inc., Document ID: 17054, retrieved from the internet: <URL: https://www.cisco.com/c/en/us/support/docs/lan-switching/integrated-routing-bridging-irb/17054-741-10.html>, Aug. 31, 2009, 9 pages.
Sivasubramanian, B. et al., "Understanding and Configuring Multilayer Switching" in: Froom, R. et al., *Building Cisco Multilayer Switched Networks (BCMSN) (Authorized Self-Study Guide)*, 4th Edition, Chapter 9, Jul. 6, 2007, pp. 410-439.

* cited by examiner

*Primary Examiner* — Un C Cho
*Assistant Examiner* — Fangyan Deng
(74) *Attorney, Agent, or Firm* — Cooley LLP

(57) ABSTRACT

In some embodiments, a network segment within a switch fabric system includes a layer-2 flood route database and a layer-3 switch interface operatively coupled to the flood route database. The flood route database is configured to store layer-2 flood route information associated with the network segment and contains information such as a set of port identifiers and a set of status indicators. Each port identifier identifies a particular port within the network segment and each status indicator is uniquely associated with a particular port identifier. The layer-3 switch interface associated with the network segment is automatically activated when the flood route database contains at least one valid port identifier and the status indicator associated with at least one port identifier is active. This can allow data traffic to flow between separate network segments within the switch fabric system.

21 Claims, 6 Drawing Sheets

| L3 Interface 500 | |
|---|---|
| Destination ID 510 | Next Hop ID 520 |
| D1 | NH1 |
| D2 | |
| D3 | |
| D4 | |
| D5 | NH2 |
| D6 | |
| D7 | NH3 |
| D8 | |
| D9 | |
| D10 | |
| D11 | |
| D12 | |
| Destination$_T$ | Next Hop$_N$ |

FIG. 6

| Flood Route Database 400 | | |
|---|---|---|
| Network Segment ID 410 | Port ID 420 | Status 430 |
| 1 | P1 | Active |
| | P2 | Inactive |
| | P3 | Active |
| | P4 | Active |
| 2 | P5 | Inactive |
| | P6 | Inactive |
| | P7 | Active |
| | P8 | Inactive |
| | P9 | Inactive |
| 3 | P10 | Active |
| | P11 | Active |
| | P12 | Inactive |
| N | Port$_T$ | Status$_T$ |

FIG. 5

METHODS AND APPARATUS FOR MAINTAINING AN INTEGRATED ROUTING AND BRIDGING INTERFACE

BACKGROUND

Some embodiments described herein relate generally to data flow in a network system and, in particular, to the dynamic and automatic maintenance of a layer-3 integrated routing and bridging (IRB) interface within a network segment, such as a virtual local area network (VLAN), of a distributed network system.

Some known networking systems control an IRB interface by local state machines based on corresponding layer-2 interfaces on any router/switch. To keep the IRB interface active, at least one layer-2 interface of the corresponding VLAN typically remains active on a given router or switch. In the case of a switch fabric system that is a distributed network, however, VLANs can span multiple nodes (distributed VLANs) including the node that is enabled for routing and supports layer-3 protocols. This designated node may or may not have the corresponding layer-2 interface that is used to keep up the IRB interface. In such cases, the IRB interface may be inactivated because of no layer-2 interface or an inactive layer-2 interface on the designated VLAN node. This can prevent any routes to be advertised on routing protocols and can prevent peripheral devices like servers or workstations to be connected to the core network. Accordingly, such networking systems do not operate as efficiently as possible.

Accordingly, a need exists for network segments within a networking system to have IRB interfaces or Layer 3 switch interfaces that are based on flood routes associated with all the nodes in a distributed VLAN, and that can be dynamically configured based on the processing needs of the networking system. Such IRB interfaces may or may not have underlying layer-2 interfaces on physical devices within the network segment, but will still be maintained in the "up" or "active" state based on the flood routes.

SUMMARY

In some embodiments, a network segment within a switch fabric system includes a layer-2 flood route database and a layer-3 switch interface operatively coupled to the flood route database. The flood route database is configured to store layer-2 flood route information associated with the network segment and contains information such as a set of port identifiers and a set of status indicators. Each port identifier identifies a particular port within the network segment and each status indicator is uniquely associated with a particular port identifier. The layer-3 switch interface associated with the network segment is automatically activated when the flood route database contains at least one valid port identifier and the status indicator associated with at least one port identifier is active. This can allow data traffic to flow between separate network segments within the switch fabric system.

BRIEF DESCRIPTION OF THE DRAWINGS

FIG. 5 is an illustration of a flood route database associated with an edge device or a compute device of a network segment within a switch fabric system, according to an embodiment.

FIG. 6 is an illustration of an integrated routing and bridging (IRB) interface or a level-3 (L3) interface associated with an edge device of a network segment within a switch fabric system, according to an embodiment.

DETAILED DESCRIPTION

Figure 1:
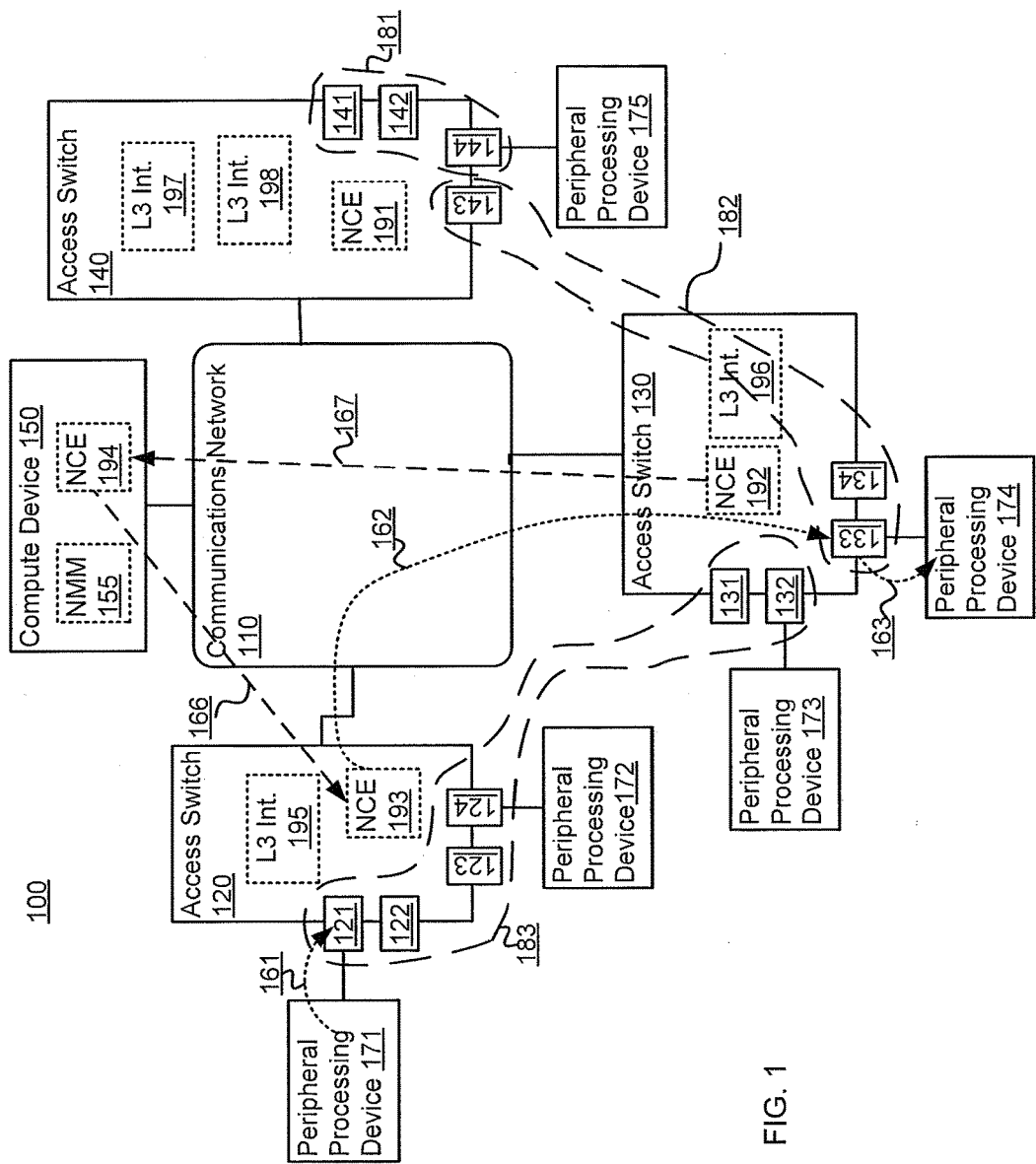
FIG. 1 is a schematic diagram that illustrates a switch fabric system, according to an embodiment.

In some embodiments, a network segment within a switch fabric system includes a layer-2 flood route database and a layer-3 switch interface operatively coupled to the flood route database. The flood route database is configured to store layer-2 flood route information associated with the network segment and contains information such as a set of port identifiers and a set of status indicators. Each port identifier identifies a particular port within the network segment and each status indicator is uniquely associated with a particular port identifier. The layer-3 switch interface associated with the network segment is automatically activated when the flood route database contains at least one valid port identifier and the status indicator associated with at least one port identifier is active. This can allow data traffic to flow between separate network segments within the switch fabric system.

In some embodiments, a non-transitory processor-readable medium includes code to cause a processor to receive, at an edge device, a signal that a peripheral processing device operatively coupled to the edge device is associated with a particular network segment. A network segment can be a virtual local area network (VLAN), a subnet, a routing domain, and/or the like. An edge device can be an access switch, an input/output module, a top-of-rack device, and/or the like. A peripheral processing device can be a router, a server, a storage device, a gateway, a workstation, and/or the like. Upon receiving this signal, the code causes the processor at the edge device to update the layer-2 flood route information associated with the network segment. The layer-2 flood route information includes a set of identifiers associated with nodes to which layer-2 information associated with the network segment is sent when the nodes are operative. A node can be a compute node, a storage node, a service node, a router, and/or the like. This can maintain a layer-3 switch interface uniquely associated with the network segment in an active state when at least one of the identifiers associated with nodes in the network segment is valid and the status indicator associated with at least one identifier is in the active state. An activated layer-3 switch interface can provide layer-3 connectivity to the switch fabric and can allow data to flow between separate network segments within the switch fabric system without the use of a router.

In some embodiments, a layer-3 switch interface can be configured to provide layer-3 functionality to an edge device of a distributed switch. The layer-3 switch interface can have an active and an inactive state and is uniquely associated with a network segment of the distributed switch. The layer-3 switch interface can be configured to be in the active state when the layer-2 flood route information associated with the network segment includes at least one entry having an identifier of a port of the edge device, and a status indicator uniquely associated with at least one entry in the flood route database is in the active state.

Embodiments shown and described herein refer to multiple communication layers (e.g., Data Link Layer (layer-2), Network Layer (layer-3), Physical Layer (layer-1), Application Layer (layer-7), etc.). Such communication layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer while a Border Gateway Protocol (BGP) can be associated with and/or implemented at a higher layer, such as, for example, an application layer. While a BGP can be implemented at the application layer, BGP can also be used to send forwarding-state information (e.g., port identifiers, network segment identifiers, peripheral processing device identifiers, etc.) used to populate a routing table associated with a network layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2) / layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-175. The peripheral processing devices 171-175 are operatively coupled to each other by remaining portions of the switch fabric system 100. The peripheral processing devices 171-175 can be, for example, compute nodes, service nodes, routers, and storage nodes, as described in further detail herein. In some embodiments, for example, the peripheral processing devices 171-175 can include servers, storage devices, gateways, workstations, and/or the like.

The peripheral processing devices 171-175 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to an access switch 120, 130, 140, as described in further detail herein. As such, the peripheral processing devices 171-175 can send data (e.g., data packets, data cells, etc.) to and receive data from the access switches 120, 130, 140. In some embodiments, the connection between the peripheral processing devices 171-175 and the access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device that operatively couples peripheral processing devices 171-175 to the communications network 110. In some embodiments, for example, the access switches 120, 130, 140 can be edge devices, input/output modules, top-of-rack devices and/or the like. Structurally, the access switches 120, 130, 140 can function as both source access switches and destination access switches. Accordingly, the access switches 120, 130, 140 can send data (e.g., a data stream of data packets and/or data cells) to and receive data from the communications network 110, and to and from the connected peripheral processing devices 171-175.

Each of the access switches 120, 130, 140 is operable to communicate with the other access switches 120, 130, 140 via the communications network 110 (e.g., within both a control plane portion and data plane portion). Specifically, the data plane portion of the communications network 110 provides any-to-any connectivity between the access switches 120, 130, and 140 at relatively low latency. For example, the data plane portion of the communications network 110 can transmit (e.g., convey) data between access switches 120, 130, and 140. In some embodiments, the communications network 110 can have at least hundreds or thousands of ports (e.g., egress ports and/or ingress ports) through which access switches 120, 130, 140 can transmit and/or receive data.

Figure 2:
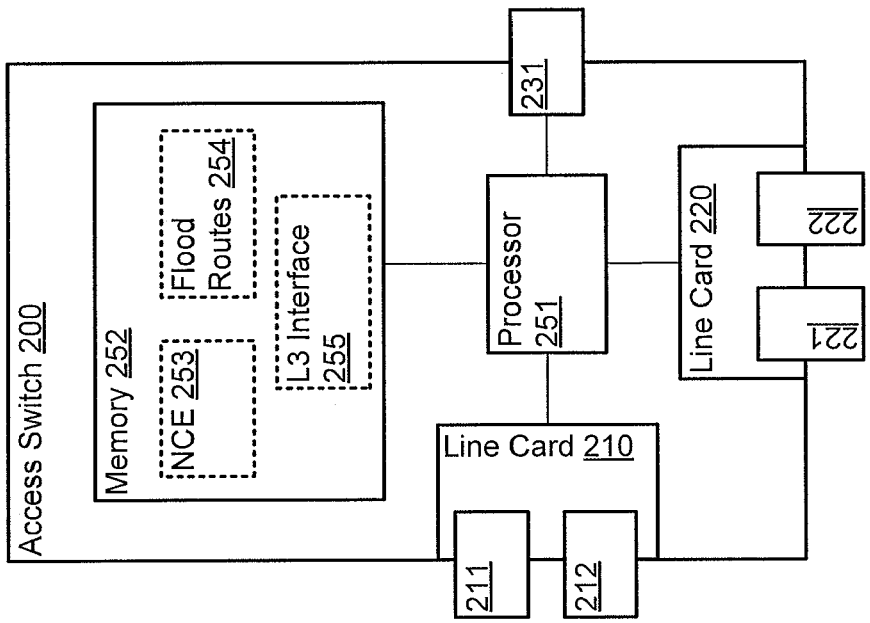
FIG. 2 is a system block diagram of an access switch, according to an embodiment.

FIG. 2 is a system block diagram of an access switch 200 similar to the access switches 120, 130, and 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 can include one or more processors and/or memories.

The memory 252 can include a network control entity (NCE) 253, flood routes 254, and a layer-3 (L3) interface 255. The network control entity 253 can be a process, application, virtual machine, and/or some other software module (executing in hardware) or a hardware module that is executed at the access switch 200. In some embodiments, for example, instructions that implement network control entity 253 can be stored at memory 252 and executed at processor 251. The flood routes 254 can be a database containing a list of identifiers of ports associated with a network segment (e.g., a VLAN, a subnet, etc.) to which control information (e.g., layer-2 control information) can be flooded, the identifier of the port through which each individual device is connected to the network segment, and a status indicator of each device, as described herein. The layer-3 (L3) interface 255 can be a routing table that contains a list of destination IDs for a data packet (e.g., IP address of destination device), and the ID of the device in the next physical hop step, as described herein. In some embodiments, the L3 interface can be, for example, an integrated routing and bridging (IRB) interface and can provide layer-3 connectivity to the switch fabric 100 and can allow data to flow between separate VLANs. In most embodiments, an L3 interface is associated with one dedicated network segment and is not associated with other network segments in the switch fabric. In other embodiments, the L3 interface can detect both Internet Protocol version 4 (IPv4) and Internet Protocol version 6 (IPv6) unicast and multicast virtual routing and forwarding (VRF) traffic.

In some embodiments, multiple edge devices can be part of the same network segment, for example, access switch 120 and 130 can be part of the same VLAN. In such embodiments, the L3 interface located in the memory of both the access switches 120 and 130, for example, L3 interface 195 on access switch 120 and L3 interface 196 on access switch 130 as shown in FIG. 1, can contain substantially identical information and can be updated at substantially the same time or within a time period that allows that L3 interfaces to be substantially synchronized. In such embodiments, L3 interface 195 and L3 interface 196 can be said to be different instances of the same L3 interface. In yet other embodiments, an edge device can have ports associated with different network segments, for example, access switch 140 has port 143 associated with one VLAN, and ports 141, 142 and 144 associated with a separate VLAN. In such embodiments, access switch 140 can have two separate L3 interfaces located in the memory, for example L3 interface 197 and L3 interface 198 as shown in FIG. 1, with each L3 interface containing information associated with its associated VLAN.

Similar to the ports 121-124, 131-134, 141-144 of the access switches 120, 130, 140 shown in FIG. 1, ports 211, 212, 221 and 222 shown in FIG. 2 can communicate with peripheral processing devices (e.g., peripheral processing device 171-175 in FIG. 1). For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, access switch 200 can be an edge device of a network switch such as a distributed network switch.

In some embodiments, the access switch 200 can prepare a data packet (e.g., an Ethernet packet) to enter a communications network (e.g., communications network 110). For example, the access switch 200 can forward, classify, and/or modify the packet encapsulation (e.g., modify, add and/or remove a header portion, footer portion and/or any other identifier included within the data packet) of a data packet prior to sending the data packet to the communications network 110. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
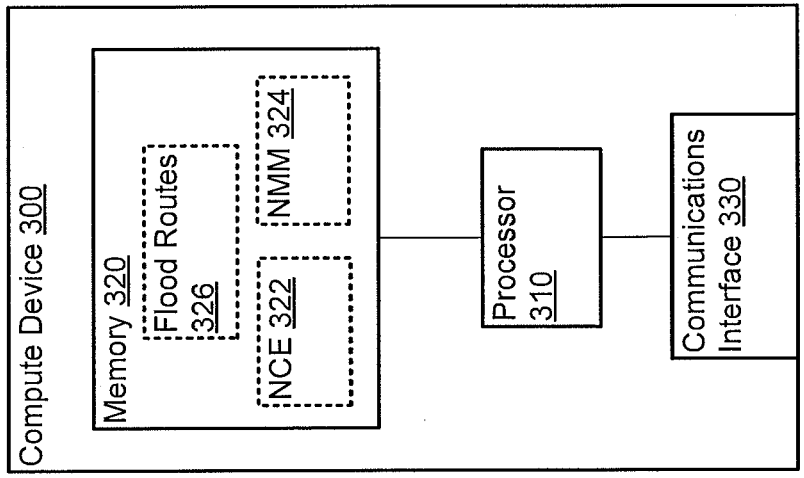
FIG. 3 is a system block diagram of a compute device, according to an embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, memory 320 can host flood routes 326, a network control entity (NCE) 322 and a network management module (NMM) 324 similar to the network control entity 194 and the network management module 155, respectively. The flood routes 326 can be a database containing a list of identifiers of ports associated with a network segment (e.g., a VLAN or a subnet) to which control information (e.g., layer-2 control information) can be flooded, the ID of the port through which each device is connected to the network segment, and the status indicator of each device, as described herein. Network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules in addition to network control entity 322 and/or network management module 324. For example compute device 300 can be a general purpose compute device or compute node that hosts multiple processes, applications, virtual machines, and/or software modules.

Returning to FIG. 1, and as described in further detail herein, the access switches 120, 130, 140 can host network control entities 191-193 to manage the ports 121-124, 131-134, 141-144 of the access switches 120, 130, 140. Accordingly, the network control entities 191-193 can be part of a control plane of the switch fabric system 100. Each network control entity 191-193 can be a process, application, virtual machine, and/or some other software module (executing in hardware and/or stored in memory) or a hardware module executed at an access switch 120, 130, 140 or a compute device 150. As such, instructions that implement the network control entity 191-193 can be stored within a memory of an access switch 120, 130, 140 (e.g., memory 252) and/or executed at a processor of an access switch 120, 130, 140 (e.g., processor 251).

Each network control entity 191-193 can manage ports 121-124, 131-134, 141-144 of the access switches 120, 130, and 140. For example, network control entity 191 is operable to manage the ports 141, 142, 144 associated with the group of ports 181, network control entity 192 is operable to manage the ports 133, 134, 143 associated with the group of ports 182, and network control entity 193 is operable to manage the ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183, monitor a state and/or status of peripheral processing devices associated with its group of ports 181, 182, 183, and/or manage and maintain other information associated with the peripheral processing devices and/or ports associated with its group of ports 181, 182, 183, respectively.

In some embodiments, a network control entity can control and/or manage ports at an access switch at which the network control entity is located (e.g., network control entity 191 manages the group of ports 181). In other embodiments, a network control entity can also control and/or manage ports at an access switch other than the access switch at which the network control entity is located (e.g., network control entity 193 manages ports 131 and 132, and network control entity 192 manages port 143). In such embodiments, the network management module 155 has flexibility to assign each port 121-124, 131-134, 141-144 to a network control entity 191-193 based on processing capacity, processing load, etc. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

The compute device 150 can host management modules, processes and/or functions associated with the switch fabric system 100. As shown in FIG. 1, the compute device 150 can host a network management module 155 and a network control entity 194. The network control entity 194 can function as a route reflector between the other network control entities 191-193. Similarly stated, the network control entity 194 can function as an intermediary network control entity between the network control entities 191-193 at the access switches 120, 130, and 140. The network management module 155 and the network control entity 194 can be part of the control plane of the switch fabric system 100.

Figure 4:
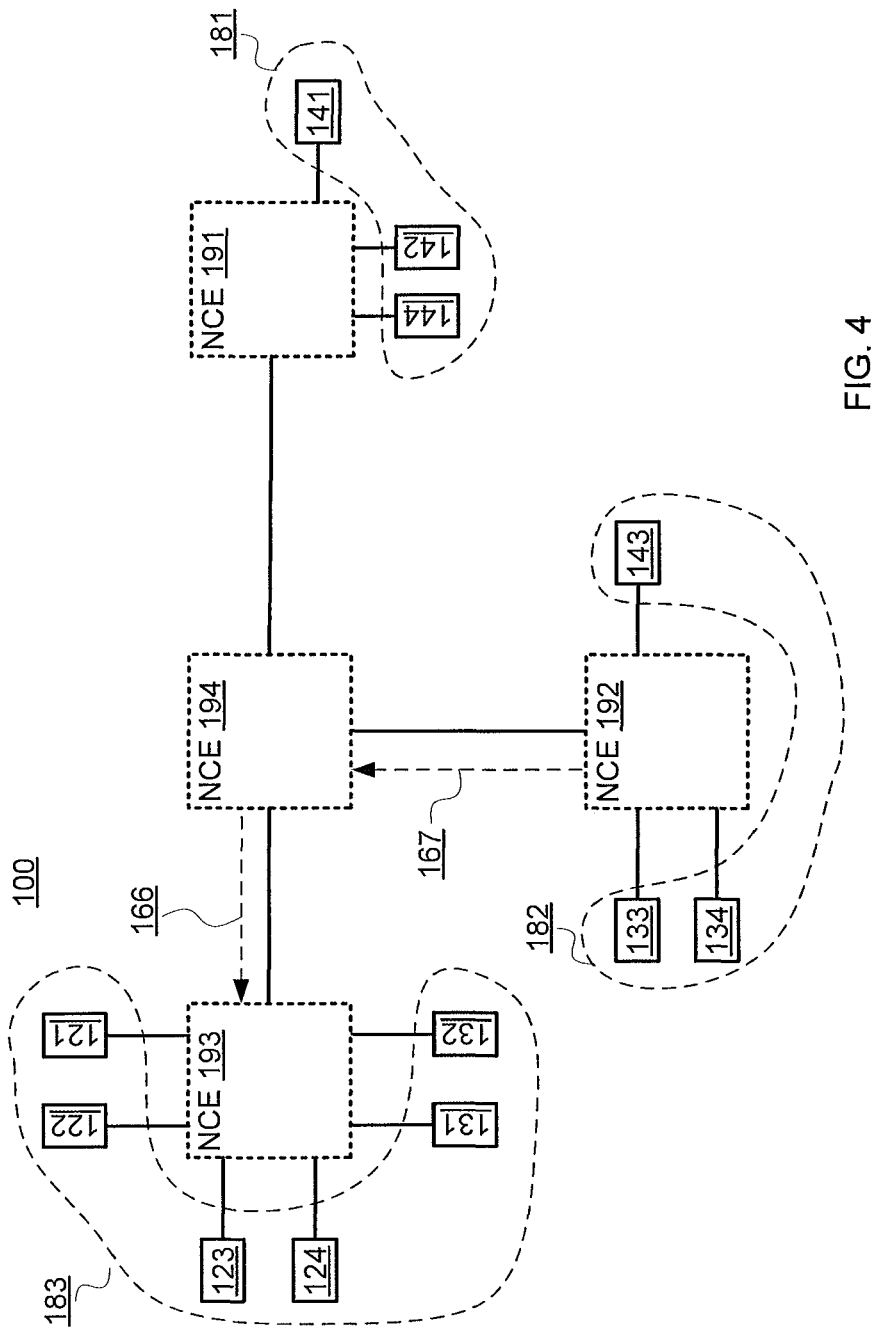
FIG. 4 is a block diagram of a logical topology of the control plane of the switch fabric system.

FIG. 4, for example, is a block diagram of a logical topology of the control plane of the switch fabric system 100, shown in FIG. 1. As shown in FIG. 4, in the control plane, the network control entities 191-193 are operatively coupled to each other through the network control entity 194. As shown in FIG. 1, and as described in further detail herein, such a connection can be through a control plane portion of the communications network 110.

The network control entities 191-193 can send forwarding-state information (e.g., using a control signal) to each other via the network control entity 194. For example, as described in further detail herein, network control entity 192 can send forwarding-state information associated with the group of ports 182 to the network control entity 193 via the network control entity 194 (e.g., shown as path 166 and path 167 in FIGS. 1 and 4). In such an example, the path between the network control entity 192 and the network control entity 193 can be said to include two physical hops as well as two logical hops. Similarly stated, the control plane of the switch fabric system 100 can include multiple logical and physical hops. In some embodiments, the network control entity 194 can be said to be a route reflector (e.g., a Boarder Gateway Protocol (BGP) Route Reflector).

In some embodiments, the network control entities 191-193 can send forwarding-state information to the other network control entities 191-193 over the control plane using a targeted higher level protocol (e.g., an application layer protocol) such as, for example, a Boarder Gateway Protocol (BGP). In such embodiments, a network control entity 191-193 can use such a higher level protocol in conjunction with any suitable lower level protocol (e.g., a data link layer protocol), such as, for example, Ethernet and/or Fibre channel, to send the forwarding-state information. While BGP can be implemented at the application layer, BGP can be used to send forwarding-state information used to populate a routing table (e.g., stored at the network control entities 191-193) associated with a network layer. Using a targeted protocol, such as BGP, a network control entity 191-193 can send the forwarding-state information to specific network control entities 191-193 while refraining from sending the forwarding-state information to other network control entities 191-193, as described in further detail herein.

In some embodiments, the network control entity 194 can store an address and/or identifier associated with each network control entity 191-193. In such embodiments, when a network control entity 191-193 has updated forwarding-state information to distribute, the network control entity 191-193 can send the updated forwarding-state information to the network control entity 194. The network control entity 194 can then send the forwarding-state information to the other network control entities 191-193. In other embodiments, the network control entities 191-193 are directly coupled to each other within the control plane without a network control entity 194 acting as a route reflector. In such embodiments, the network control entities 191-193 can store an address and/or identifier associated with each other network control entity 191-193 and can send updated forwarding-state information directly to the other network control entities 191-193 via the control plane.

In some embodiments, each network control entity 191-193 can be part of a network segment (e.g., a virtual local area network (VLAN), a virtual switch fabric, etc.). For example, network control entity 192 and network control entity 193 can be part of a first network segment and network control entity 191 can be part of a second network segment. In such embodiments, each network control entity 191-193 only sends forwarding-state information to the other network control entity (ies) within the same network segment. Accordingly, the network control entity 194 only sends updated forwarding-state information received from a network control entity 191-193 to the other network control entities 191-193 associated with its network segment. As such, in the above example the network control entity 192 sends forwarding-state information to the network control entity 193 but not the network control entity 191. Accordingly, the ports 141, 142, 144 associated with the network control entity 191 (associated with the second network segment) do not send data to the ports 121-124, 131-134, 143 associated with the network control entities 192 and 193 (associated with the first network segment).

Returning to FIG. 1, the network management module 155 can be a process, application, virtual machine, and/or some other software module (executing in hardware and/or stored in memory) or a hardware module executed at the compute device 150. The network management module 155 can divide and/or partition the ports 121-124, 131-134, 141-144 of the access switches 120, 130, 140 into the groups of ports 181, 182, 183 to be managed by network control entities 191-193. As such, the network management module 155 can associate the group of ports 181 with the network control entity 191, the group of ports 182 with the network control entity 192 and the group of ports 183 with the network control entity 193.

In some embodiments, the network management module 155 can store (e.g., in a memory) a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) associated with the switch fabric system 100. As described in further detail herein, the network management module 155 can send a portion of the routing information associated with a group of ports 181, 182, 183 to the network control entities 191-193 via the control plane portion of the communications network 110. Similarly, the network management module 155 can send a portion of the routing information associated with each network control entity 191-193 to the network control entity 194. For example, the network management module 155 can send a portion of the configuration file associated with the group of ports 181 to the network control entity 191. For another example, the network management module 155 can send a portion of the configuration file associated with the network control entities 191-193 to the network control entity 194.

As shown in FIG. 1, the communications network 110 can be any suitable communications network that operatively couples the access switches 120, 130, 140 to the other access switches 120, 130, 140. Additionally, the communications network can operatively couple the compute device 150 to the access switches 120, 130, 140. In some embodiments, the communications network 110 includes a data plane portion and a control plane portion. The control plane portion of the communications network 110 facilitates transmission of control signals (e.g., configuration information, forwarding-state information, etc.) between the network control entities 191-194 and the network management module 155. Accordingly, the network control entities 191-194 can send configuration information and/or forwarding-state information to other network control entities 191-194 via the control plane portion of the communications network 110. In some embodiments, the control plane portion of the communications network 110 includes direct links between the network control entity 194 and the network control entities 191-193. In other embodiments, the control plane portion of the communications network 110 can include intermediate modules and/or switches to operatively couple the network control entities 191-193 with the network control entity 194.

The data plane portion of the communications network 110 facilitates transmission of data between access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first access switch 120, 130, 140 and a second access switch 120, 130, 140 (e.g., along with the data paths between the access switches 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 (by sending a signal to the access switches 120, 130, 140 via the control plane portion of the communications network 110 respectively, such that access switches 120, 130, 140 initiates NCEs 191-193) and, based on the processing capacity of the network control entities 191-193, assigns each port 121-124, 131-134, 141-144 to a network control entity 191-193. As shown in FIG. 1, for example, the network management module 155 associates ports 121-124, 131 and 132 (group of ports 183) with the network control entity 193; ports 133, 134 and 143 (group of ports 182) with the network control entity 192; and ports 141, 142 and 144 (group of ports 183) with the network control entity 191.

The network management module 155 can also initiate one or more intermediary network control entities and/or route reflectors by sending a signal to an access switch 120, 130, 140 and/or a compute device 150 via the control plane portion of the communications network 110. For example, the network management module 155 can initiate network control entity 194 by sending a signal to the compute device 150 via the control plane portion of the communications network 110. Alternatively, in other embodiments, the network management module 155 can also initiate network control entity 194 by sending a signal directly to the compute device 150. As shown and described above with respect to FIG. 4, each network control entity 191-193 can send control signals (i.e., signals within the control plane) to and receive control signals from the other network control entities 191-193 through network control entity 194. Additionally, as described in further detail herein, each network control entity 191-193 can store less forwarding-state information and/or routing information because the network control entity 194 can store some forwarding-state information and/or routing information in lieu of network control entities 191-193 maintaining all forwarding-state information and/or routing information. For example, each network control entity 191-193 does not store an address and/or identifier associated with the other network control entities 191-193 because the network control entity 194 stores such addresses and/or identifiers. As such, the network control entities 191-193 only store an address and/or identifier associated with the network control entity 194.

The network management module 155 can send configuration information (e.g., a configuration file) and/or forwarding-state information to each network control entity 191-194. In some embodiments, for example, each network control entity 191-193 can receive from the network management module 155 configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its associated group of ports 181-183. For example, network control entity 191 can receive configuration information and/or forwarding-state information associated with the group of ports 181, network control entity 192 can receive configuration information and/or forwarding-state information associated with the group of ports 182 and network control entity 193 can receive configuration information and/or forwarding-state information associated with the group of ports 183. The network control entity 194 can receive configuration information and/or forwarding-state information associated with the network control entities 191-193. As such, the network control entity 194 can act as an intermediary and/or a route reflector (e.g., a BGP Route Reflector) between the network control entities 191-193.

Each network control entity 191-193 can send initial and/or updated forwarding state information to the other network control entities 191-193 when the forwarding state associated with its group of ports 181-183 is initiated, changed and/or modified. In some embodiments, for example, when network control entities 192 and 193 are on the same network segment, in response to the peripheral processing device 174 being initially coupled to the port 133, the network control entity 192 can send forwarding state information associated with the port 133 and the destination peripheral processing device 174 to the network control entity 193. In other embodiments, for example, when network control entities 192 and 191 are on the same network segment, the network control entity 192 can also send the forwarding state information to the network control entity 191.

As shown in FIGS. 1 and 4, the network control entity 192 sends the forwarding-state information to the network control entity 194 via the path 167. Specifically, the network control entity 192 retrieves an identifier and/or address associated with the network control entity 194 (e.g., stored in a memory of the access switch 130) and sends the forwarding-state information accordingly. The network control entity 194 can then send the forwarding-state-information to the network control entity 193. Specifically, the network control entity 194 determines that the forwarding-state information should be sent to the network control entity 193 (e.g., the network control entity 193 is part of a same network segment as the network control entity 192), retrieves an identifier and/or address associated with the network control entity 193 (e.g., stored in a memory of the compute device 150), and sends the updated forwarding-state information accordingly. Such a path 167, 166 between the network control entity 192 and the network control entity 193 can be said to include multiple physical hops and multiple logical hops. In particular, the path 167, 166 between the network control entity 192 and the network control entity 193 includes two physical hops and two logical hops (e.g., 166, 167) within the control plane of the switch fabric system 100, as shown in FIG. 4.

In some embodiments, the network control entity 193 can store the forwarding-state information received from the network control entity 194 in a memory associated with the network control entity 193. For example, the network control entity 193 can store the forwarding-state information at the memory (e.g., memory 252) of the access switch 120 at which the network control entity 193 is located. Similarly stated, the network control entity 193 can update a configuration and/or forwarding-state table within the memory of the access switch 120 in response to receiving the forwarding-state information. In some embodiments, the forwarding-state information can be stored at a portion of the memory of the access switch 120 allocated and/or partitioned for the network control entity 193.

The network control entity 193 can then send the updated forwarding-state information to the access switches 120, 130 at which ports 121-124, 131, 132 associated with the network control entity 193 are located. In some embodiments, for example, the network control entity 193 can store the forwarding-state information at a portion of the memory (e.g., within a routing table) of the access switch 120 allocated and/or partitioned for data, processes and/or applications associated with the access switch 120. In such embodiments, the memory of the access switch 120 can store the forwarding-state information in a portion of the memory associated with the network control entity 193 as well as in a portion of the memory associated with the remaining entities, processes and/or modules of the access switch 120. In other embodiments, the forwarding-state information is stored within a single location within the memory of the access switch 120 accessible by the applicable processes at the access switch 120 (including the network control entity 193). The network control entity 193 also sends the forwarding-state information to the access switch 130 (ports 131 and 132 at access switch 130 are associated with the network control entity 193). Similar to the access switch 120, the access switch 130 can store the forwarding-state information within a memory (e.g., within a routing table).

In some embodiments, for example, when a peripheral device 173 connects to the switch fabric system 100 via port 132 on access switch 130, the network segment ID, port ID, status information and MAC address of peripheral device 173 can be updated in the flood route database associated with that particular network segment (e.g., a VLAN). This can enable all the devices associated with the VLAN to detect the presence of the newly connected peripheral processing device 173 and can facilitate the accurate and targeted data transfer between all the devices associated with the VLAN.

A data packet (e.g., an Ethernet packet) can be sent between peripheral processing devices 171-175 using remaining portions of the switch fabric system 100. For example, a data packet can be sent from a source peripheral processing device 171 to a destination peripheral processing device 174. The source peripheral processing device 171 can send the data packet to the access switch 120 through port 121 using a first data link layer protocol (e.g., Ethernet, Fibre Channel, etc.). This is shown by path 161 in FIG. 1.

Based on the forwarding-state information received from the network control entity 193, the access switch 120 can prepare the data packet to enter the communications network 110. In some embodiments, for example, the access switch 120 can add and/or append a header (e.g., encapsulate) to the data packet having a destination address of the peripheral processing device 174 and/or the port 133. In some embodiments, the access switch 120 can also divide and/or partition the data packet into multiple data cells to be sent through the data plane portion of the communications network 110 to the access switch 130.

The data packet and/or cells is/are sent to the access switch 130 through the data plane portion of the communications network 110 as illustrated by path 162. The data plane portion of the communications network 110 can route and/or forward the data packet and/or cells based on the destination address of the peripheral processing device 174 and/or the port 133. As such, the data plane portion of the communications network 110 can use a second data link layer protocol, different from the first data link layer protocol (e.g., Ethernet, Fibre Channel, etc.) used to send the data packet from the peripheral processing device 171 to the access switch 120. Accordingly, while the data packet can transverse multiple physical hops when in the communications network 110 (e.g., between stages of the multi-stage switch fabric), the path 162 between the access switch 120 and the access switch 130 can be a single logical hop from the perspective of the first data link layer protocol within the data plane portion of the communications network 110.

The access switch 130 can then prepare the data packet and/or cells to be sent to the peripheral processing device 174 via the port 133 as shown by path 163. Such preparation can include removing the header (e.g., decapsulating the data packet) having the destination address of the peripheral processing device 174 and/or the port 133 from the data packet and/or cells. In some embodiments, such preparation can also include reconstructing and/or reassembling the data packet from the data cells. More generally, the access switch 130 can prepare the data packet to be sent to the peripheral processing device 174 using the first protocol (e.g., Ethernet, Fibre Channel, etc.). After the data packet is ready, the access switch 130 sends the data packet to the peripheral processing device 174 through port 133.

In some embodiments, for example, a source peripheral processing device 174 (connected to port 133 of the access switch 130 and associated with network control entity 192) may send a data packet to a target destination peripheral processing device connected to a separate network segment (e.g., peripheral processing device 175 connected to port 144 on access switch 140). In such an embodiment, the source peripheral processing device 174 can send the data packet to the access switch 130 through port 133 using a first data link layer protocol (e.g., Ethernet, Fibre Channel, etc.). The data packet can contain the IP address of the destination device to which the data packet is targeted to reach (e.g., peripheral processing device 175). This IP address of the destination device can be used to populate and/or update a network layer layer-3 (L3) interface database associated with access switch 130. The ID of the next physical hop link in the data pathway (e.g., the MAC address of the next device in the subsequent physical hop link on the way to the destination device access switch 140) can then be read from the layer-3 (L3) interface database and the data packet can be routed to that address.

In other embodiments, updated forwarding state information is sent when requested by a network control entity (e.g., prior to sending data through the communications network 110). For example, the network control entity 193 managing the port 121 associated with the source peripheral processing device 171 can request forwarding-state information from the network control entity 192 managing the port 133 associated with the destination peripheral processing device 174. Such a request can be sent after a packet destined for peripheral processing device 174 is received at access switch 120 from peripheral processing device 171 but before that packet is sent from access switch 120. While not shown in FIG. 1 or FIG. 4, such a request can be sent via the network control entity 194 via connections within the control plane portion of the communications network 110.

In still other embodiments, the network control entity 194 can store forwarding-state information associated with each network control entity 191-193 with which it is associated. Accordingly, in such embodiments, the network control entity 193 sends the request for forwarding-state information to the network control entity 194. In some embodiments, such a request can be sent after a packet destined for a destination device (e.g., peripheral processing device 174) is received at access switch 120 from peripheral processing device 171 but before that packet is sent from access switch 120. In response to the request, the network control entity 194 can send the forwarding-state information to the network control entity 193. In some embodiments, in response to a request, the network control entity 192 and/or the network control entity 194 also sends forwarding-state information associated with the other ports 134 and 143 of the group of ports 182 that the network control entity 192 manages.

FIG. 5 is an illustration of a flood route database 400 associated with an edge device (e.g., an access switch) or a compute device of a network segment within a switch fabric system 100, according to an embodiment. Flood Route database 400 is a layer-2 (L2) interface database that contains the corresponding network segment ID 410, the port ID 420 and the status 430 of the different peripheral processing devices connected to the access switch. A network segment can be, for example a VLAN, a subnet, a group of workstations connected to a token ring LAN, and/or the like. The network segment ID 410 can contain the identification number of the different network segments associated with the different peripheral devices connected to the edge device or compute device via the different ports. In some embodiments, a single access switch can be part of one or more network segments as seen, for example, in access switch 140 (containing the ports 141-144) in FIGS. 1 and 4. The port ID 420 is the identification number of the different ports associated with the access switch. In some embodiments, the ports can allow an access switch to communicate with peripheral processing devices, such as, for example, computer servers (servers) or workstations, via a common protocol such as Ethernet or Fibre Channel. In other embodiments, the ports can allow an access switch to communicate with other access switches via a communications network such as a switch fabric. The status 430 column of the flood route database 400 depicts the status of the different devices connected to an edge device or a compute device. For example, in some embodiments, a peripheral processing device can be physically connected to a port of an access switch but can be turned or powered-off. In such embodiments, the status associated with the port connected to this peripheral processing device can be "Inactive." In other embodiments, the peripheral processing device connected to a port of an access switch can be powered-on, but in an inactive state. For example, a test device or a device under maintenance can be powered-on, but in an inactive state. In such embodiments, the status associated with the port connected to this peripheral processing device can be "Inactive." In yet other embodiments, if the peripheral processing device connected to a port of an access switch is turned or powered-on, the status associated with the port connected to the peripheral processing device can be "Active."

FIG. 6 is an illustration of an integrated routing and bridging (IRB) interface or a layer-3 (L3) interface 500 associated with an edge device (e.g., an access switch) of a network segment within a switch fabric system 100, according to an embodiment. The L3 interface can contain a database that, for example, can be a routing table that can contain the Destination ID 510 of a data packet and the Next Hop ID for the data packet. The Destination ID 510 can be, for example, an IP address or a Fibre Channel identifier of the destination device to which the data packet is targeted. The Next Hop ID 520 entry can contain the MAC address of the next machine/device in the subsequent physical hop link on the way to the destination of a data packet. In some embodiments, the L3 interface can detect both IP addresses and MAC addresses, and can route data to other L3 interfaces on the same switch fabric or other switch fabrics.

Figure 7:
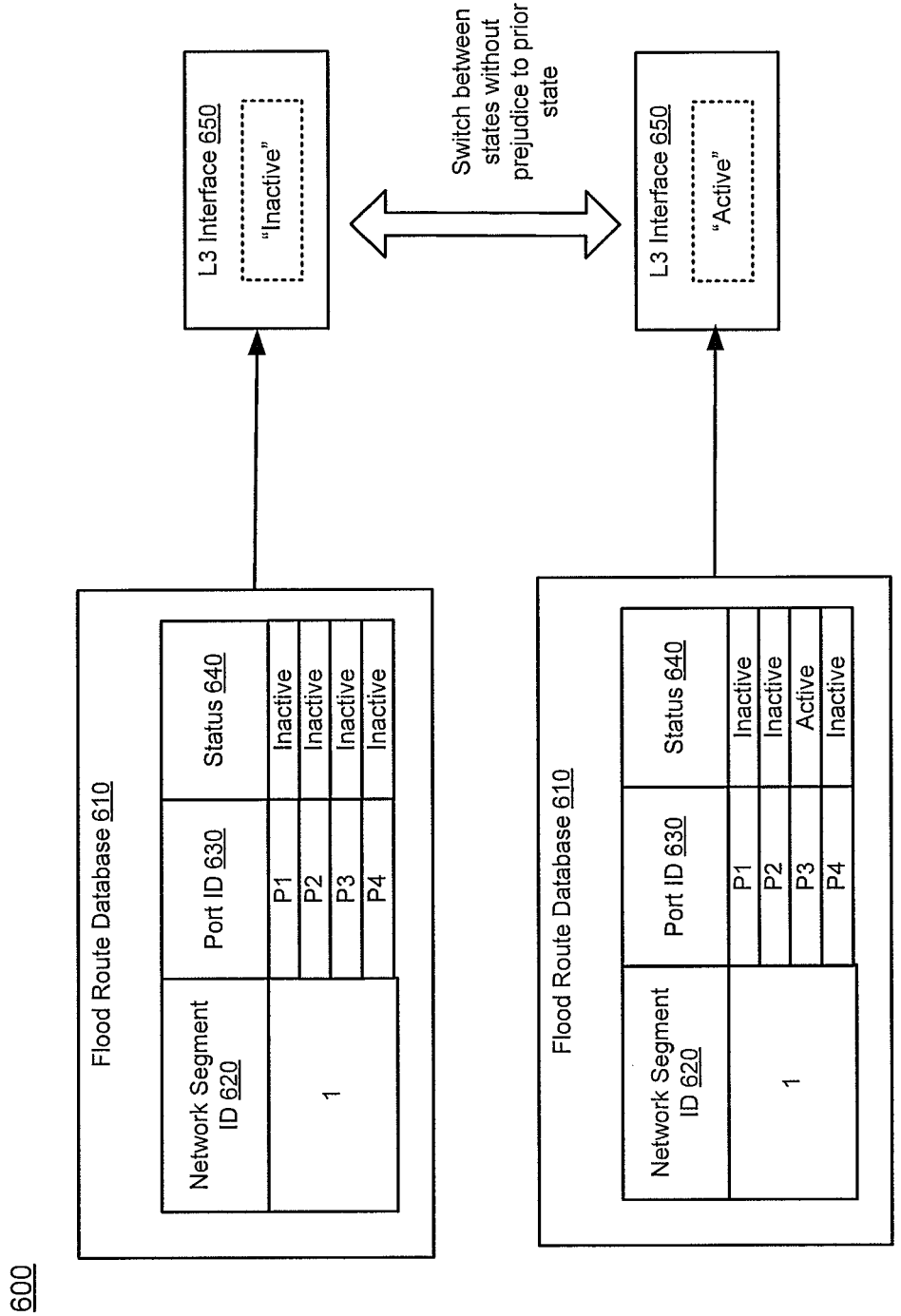
FIG. 7 is an illustration of the process of dynamically maintaining a layer-3 (L3) interface operatively coupled to a layer-2 (L2) flood route database, according to an embodiment.

FIG. 7 is an illustration of the process 600 of dynamically maintaining a layer-3 (L3) interface 650 operatively coupled to a layer-2 (L2) flood route database 610, according to an embodiment. In this embodiment, the L3 interface 650 can be operatively coupled to the flood route database 610 of a particular network segment. The L3 interface 650 can be configured to be activated when: (a) the set of port IDs 630 on the flood route database 610 includes at least one valid port ID and; (b) the status indicator 640 associated with the valid port ID is active. The L3 interface 650 is configured to be inactive when either of the above conditions is not satisfied. In most embodiments, the activation state of the L3 interface 650 is dynamically maintained. In such embodiments, the L3 interface 650 can switch back and forth between the "active" and "inactive" state without prejudice to the prior state and depending on the network segment conditions at any given time. In some embodiments, when there is no valid port ID 630 in the flood route database 610 for a given network segment, for example, during maintenance or tear down, the L3 interface 650 is not activated. The activation of the L3 interface 650 occurs when at least one port ID associated with the network segment is valid and active.

Figure 8:
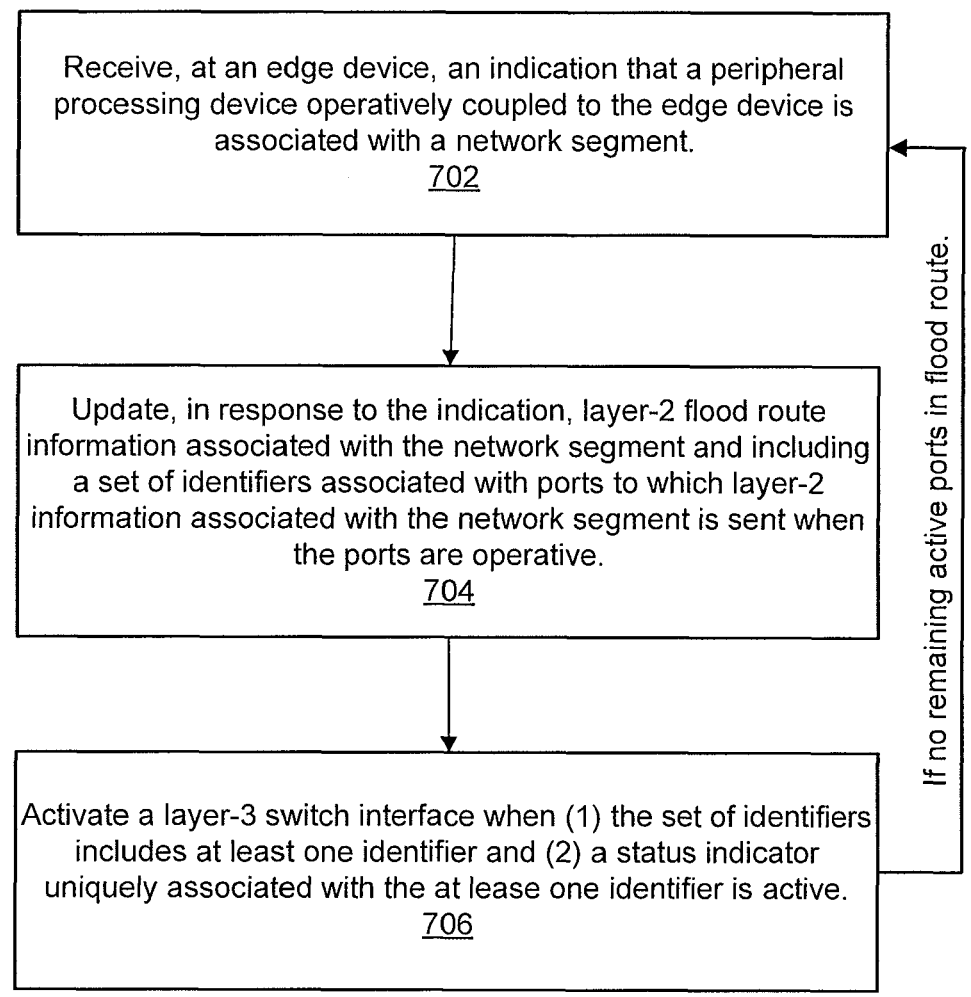
FIG. 8 is a flow chart illustrating a method of dynamically maintaining a layer-3 (L3) switch interface of a switch fabric system, according to another embodiment.

FIG. 8 is a flow chart illustrating a method 700 of dynamically maintaining a layer-3 (L3) switch interface of a switch fabric system, according to another embodiment. The method 700 includes, receiving at an edge device, a signal or an indication that a peripheral processing device is operatively coupled to the edge device and associated with a particular network segment having a unique network segment ID, at 702. As discussed above, an edge device can be any device such as access switches, input/output modules, top-of-rack devices and/or the like that can operatively couple peripheral processing devices to the communications network of a switch fabric system. Such edge devices can send data to and receive data from the communications network, and to and from the connected peripheral processing devices. Also as discussed above, the peripheral processing devices can be routers, servers, storage devices, gateways, workstations, and/or the like.

In response to the received indication or signal, at 704, the edge device then updates the layer-2 (L2) flood route information associated with the network segment that includes the set of identifiers (or Port IDs) associated with ports to which layer-2 information associated with the network segment is sent when the ports are operative. As described above, this updating step also includes assigning a status indicator to each of the identifiers (Port IDs) associated with these ports.

At 706, the layer-3 (L3) interface switch is activated when the following occur: (1) the set of identifiers (or Port IDs) associated with a particular network segment includes at lease one valid identifier; and (2) when the status indicator uniquely associated with at least one of the valid identifiers is active. As mentioned above, an activated layer-3 (L3) interface can provide layer-3 connectivity to the switch fabric and can allow data traffic to flow between separate network segments without the use of a router. If either of the two conditions described above is not fulfilled, the layer-3 (L3) interface switch is inactivated and no data can flow between separate network segments. In that event, the edge device associated with the peripheral processing device will only operate within the assigned network segment but not other network segments.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software to perform computations on relatively heavy network workloads. In some embodiments, the services nodes can perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, some embodiments of a switch fabric system (e.g., FIG. 1) include a route reflector while others do not.

What is claimed is:

1. An apparatus, comprising:
a flood route database configured to store layer-2 flood route information associated with a first network segment, the layer-2 flood route information including (1) a set of port identifiers and (2) a set of status indicators, each port identifier from the set of port identifiers being uniquely associated with a status indicator from the set of status indicators, each port identifier from the set of port identifiers identifying a port within the first network segment, each status indicator from the set of status indicators representing a status of a peripheral processing device of a set of peripheral processing devices associated with the first network segment; and
a layer-3 switch interface operatively coupled to the flood route database, the layer-3 switch interface associated with the first network segment, the layer-3 switch interface configured to be activated based on (1) the layer-2 flood route information, (2) the set of port identifiers including a port identifier being operative, and (3) the status indicator that is uniquely associated with the port identifier, indicating an active status,
the layer-3 switch interface configured to be activated based on one or more edge devices associated with the first network segment and including at least one layer-2 interface, the one or more edge devices being included in a distributed switch,
the layer-3 switch interface configured to store layer-3 routing information used to route a data packet between the first network segment and a second network segment when the layer-3 switch interface is activated, the second network segment different from the first network segment.

2. The apparatus of claim 1, wherein the flood route database is at an edge device of the one or more edge devices of the distributed switch, the layer-3 switch interface being at the edge device.

3. The apparatus of claim 1, wherein the layer-3 switch interface is configured to perform a layer-3 lookup in response to an edge device receiving the data packet having a destination identifier associated with a node outside the first network segment.

4. The apparatus of claim 1, wherein the layer-3 routing information is associated with the distributed switch.

5. The apparatus of claim 1, wherein the flood route database is configured to store layer-2 flood route information associated with the second network segment of the distributed switch, the flood route database being at an edge device with at least one port associated with the first network segment and at least one port associated with the second network segment.

6. The apparatus of claim 1, wherein the flood route database is a first flood route database from a plurality of flood route databases, each flood route database from the plurality of flood route databases being at a device from a plurality of devices of the distributed switch.

7. The apparatus of claim 1, wherein a Media Access Control (MAC) address of a peripheral processing device from the set of peripheral processing devices is sent to each port identified by the set of port identifiers when each port identified by the set of port identifiers is operative and based on the peripheral processing device being associated with the first network segment.

8. The apparatus of claim 1, wherein the first network segment is one of a virtual local area network (VLAN), a subnet, or a virtual data center fabric.

9. The apparatus of claim 1, wherein the layer-3 switch interface is configured to be activated regardless of whether the layer-3 switch interface includes the at least one layer-2 interface on the one or more edge devices associated with the first network segment.

10. A non-transitory processor-readable medium storing code representing instructions to be executed by a processor, the code comprising code to cause the processor to:
receive, at an edge device, an indication that a first peripheral processing device operatively coupled to the edge device is associated with a first network segment;
update layer-2 flood route information associated with the first network segment in response to the indication, the layer-2 flood route information including a set of identifiers associated with nodes to which layer-2 flood route information associated with the first network segment is sent when the nodes are operative; and
activate a layer-3 switch interface based on (1) the layer-2 flood route information, (2) the set of identifiers includes an identifier being operative, and (3) a status indicator that is uniquely associated with the identifier, indicating an active status, the status indicator representing a status of a second peripheral processing device of a set of peripheral processing devices associated with the first network segment, the layer-3 switch interface being uniquely associated with the first network segment,
activate the layer-3 switch interface based on one or more edge devices associated with the first network segment and including at least one layer-2 interface, the one or more edge devices being included in a distributed switch,
store layer-3 routing information used to route a data packet between the first network segment and a second network segment when the layer-3 switch interface is activated, the second network segment different from the first network segment.

11. The non-transitory processor-readable medium of claim 10, wherein the first network segment is one of a virtual local area network (VLAN), a subnet, or a virtual data center fabric.

12. The non-transitory processor-readable medium of claim 10, wherein the layer-2 flood route information is stored within a first flood route database from a plurality of flood route databases, each flood route database from the plurality of flood route databases being at a node from a plurality of nodes of the distributed switch.

13. The non-transitory processor-readable medium of claim 10, wherein the edge device is an edge device from the one or more edge devices associated with the distributed switch.

14. An apparatus, comprising:
an instance of a layer-3 switch interface configured to provide layer-3 functionality to an edge device of a distributed switch, the layer-3 switch interface being uniquely associated with a first network segment including a port of the edge device, the layer-3 switch interface having an active state and an inactive state,
the layer-3 switch interface configured to be in the active state based on (1) layer-2 flood route information associated with the first network segment includes an entry having an operative identifier of the port of the edge device and (2) a status indicator that is uniquely associated with the entry, indicating an active status, the status indicator representing a status of a peripheral processing device operatively coupled to the port of the edge device,
the layer-3 switch interface configured to be in the active state based on one or more edge devices associated with the first network segment and including at least one layer-2 interface, the one or more edge devices being included in the distributed switch,
the layer-3 switch interface configured to store layer-3 routing information used to route a data packet between the first network segment and a second network segment when the layer-3 switch interface is in the active state, the second network segment different from the first network segment.

15. The apparatus of claim 14, wherein the instance of the layer-3 switch interface is a first instance of the layer-3 switch interface and the edge device is a first edge device of the distributed switch, the apparatus further comprising:
a second instance of the layer-3 switch interface configured to provide layer-3 functionality to a second edge device of the distributed switch.

16. The apparatus of claim 14, further comprising:
a flood route database at the edge device, the flood route database including the layer-2 flood route information and the status indicator.

17. The apparatus of claim 14, wherein the first network segment is one of a virtual local area network (VLAN), a subnet, or a virtual data center fabric.

18. The apparatus of claim 14, wherein:
the entry is a first entry,
the layer-2 flood route information includes a set of entries including the first entry,
each entry from the set of entries within the layer-2 flood route information includes (1) a port identifier and (2) a status indicator, a Media Access Control (MAC) address of the peripheral processing device is sent to a port identified by each port identifier when each port identified by the set of port identifiers is operative and based on the peripheral processing device being associated with the first network segment.

19. The apparatus of claim 14, wherein the layer-3 switch interface is configured to perform a layer-3 lookup in response to the edge device receiving the data packet having a destination identifier associated with a node outside the first network segment.

20. The apparatus of claim 1, wherein the layer-3 routing information is used to route the data packet between the first network segment and the second network segment without a router when the layer-3 switch interface is activated.

21. The apparatus of claim 1, wherein no data can flow between the first network segment and the second network segment without a router when the layer-3 switch interface is not activated.

* * * * *